United States Patent
Chiu et al.

(10) Patent No.: US 8,659,907 B2
(45) Date of Patent: Feb. 25, 2014

(54) MOUNTING APPARATUS FOR EXPANSION CARD

(75) Inventors: Po-Wen Chiu, New Taipei (TW); Wen-Hu Lu, Shenzhen (CN); Zhan-Yang Li, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 389 days.

(21) Appl. No.: 13/181,636

(22) Filed: Jul. 13, 2011

(65) Prior Publication Data

US 2012/0145858 A1 Jun. 14, 2012

(30) Foreign Application Priority Data

Dec. 9, 2010 (CN) .......................... 2010 1 0580477

(51) Int. Cl.
*H05K 7/14* (2006.01)
(52) U.S. Cl.
USPC ...... 361/759; 361/752; 248/205.1; 312/233.2
(58) Field of Classification Search
USPC ................... 248/200, 205.1, 226.11, 231.81; 361/679.01, 679.02, 679.31, 679.32, 361/752, 759, 807, 825, 801, 805; 312/223.2
See application file for complete search history.

(56) References Cited

U.S. PATENT DOCUMENTS

| | | | |
|---|---|---|---|
| 6,487,070 B2 * | 11/2002 | Gan | 361/679.58 |
| 7,375,980 B2 * | 5/2008 | Peng et al. | 361/801 |
| 7,381,081 B2 * | 6/2008 | Zhang et al. | 439/377 |
| 7,626,830 B2 * | 12/2009 | Fan et al. | 361/801 |
| 7,697,302 B2 * | 4/2010 | Yan | 361/801 |
| 8,373,995 B2 * | 2/2013 | Chen | 361/759 |
| 8,379,399 B2 * | 2/2013 | Chiu et al. | 361/759 |
| 2004/0184252 A1 * | 9/2004 | Lin et al. | 361/801 |
| 2008/0198564 A1 * | 8/2008 | Chang | 361/759 |

* cited by examiner

*Primary Examiner* — Angel R Estrada
*Assistant Examiner* — Dimary Lopez
(74) *Attorney, Agent, or Firm* — Altis Law Group, Inc.

(57) ABSTRACT

A mounting apparatus includes a chassis, a mounting member, a mounting tray and a securing member. The mounting member secures an expansion card and includes a flange. The mounting tray is received in the chassis and includes a top panel, a front panel and a retaining panel connected to the front panel. The securing tab extends from the top panel. The securing member includes a base engaged with the front panel and a securing plate substantially perpendicular to the base. The resilient arm extends from the securing plate along a direction substantially parallel to a surface of the base. A clasping portion is located on the resilient arm. The flange is located between the retaining panel and the securing member, the clasping portion is engaged with the securing tab, and the resilient arm is deformable in the direction to disengage the clasping portion from the securing tab.

20 Claims, 6 Drawing Sheets

MOUNTING APPARATUS FOR EXPANSION CARD

BACKGROUND

1. Technical Field

The present disclosure relates to mounting apparatuses, and particularly to a mounting apparatus for securing expansion cards in an electronic device.

2. Description of Related Art

A computer system usually includes expansion cards, such as sound cards, video cards, graphics cards and so on, for enhancing the capabilities of the computer system. The expansion cards are often attached to the computer casing with screws. However, using screws to attach the expansion cards is laborious, crude, and time-consuming.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
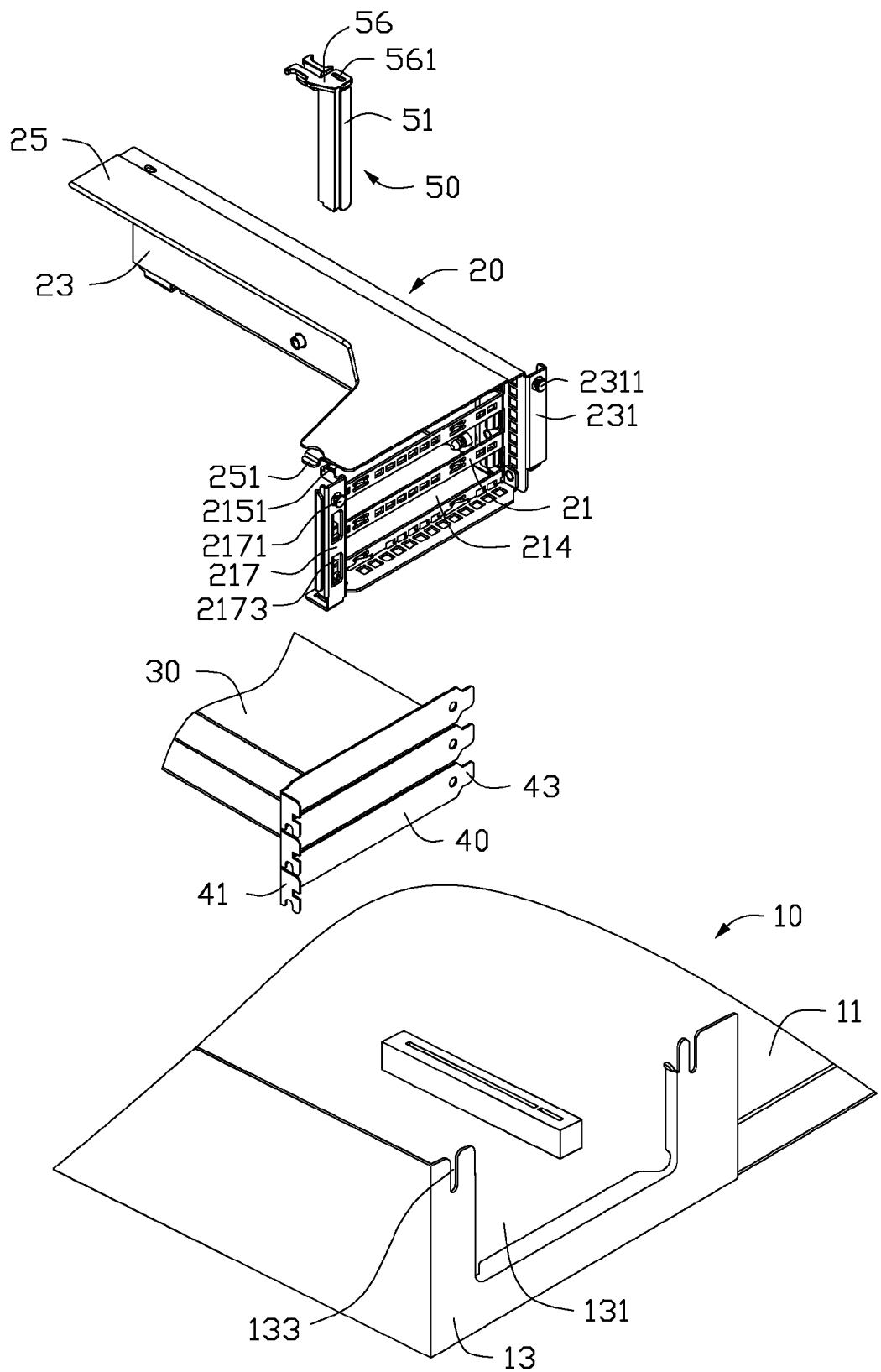
FIG. 1 is an exploded, cutaway, isometric view of a mounting apparatus for an expansion card in accordance with an embodiment.
Figure 2:
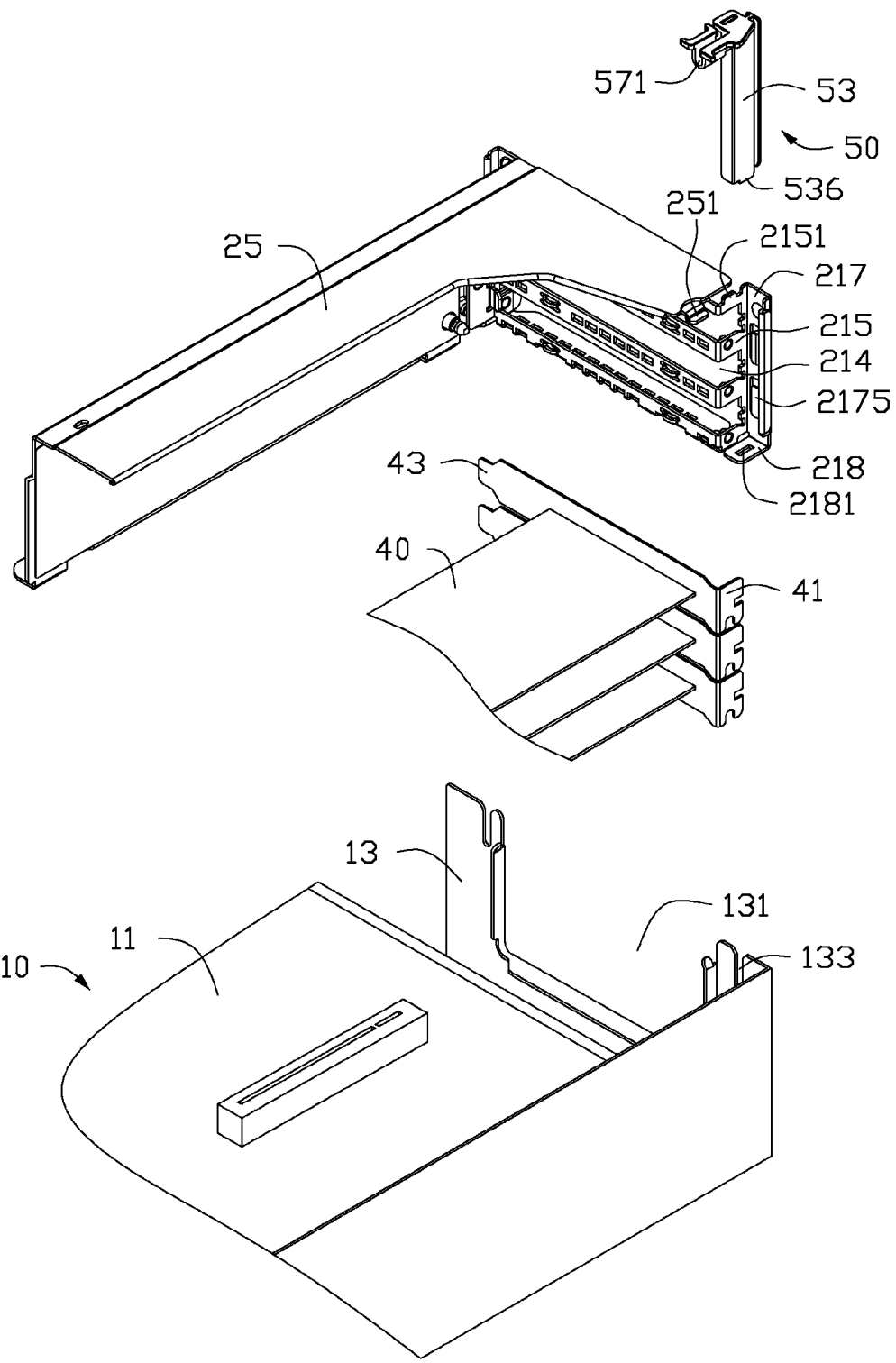
FIG. 2 is similar to FIG. 1, but viewed from a different aspect.

Referring to FIGS. 1 and 2, a mounting apparatus, according to one embodiment, securing three expansion cards 30, includes a chassis 10, a mounting tray 20, and a securing member 50. The three expansion cards 30 may be, for example, one or more than one sound cards, video cards, or graphics cards, or other Peripheral Component Interconnection (PCI) cards.

A mounting member 40 is attached to a front portion of each expansion card 30. A flange 41 is located at a first end of the mounting member 40, and an insertion portion 43 extends from a second end of the mounting member 40.

The chassis 10 includes a bottom plate 11 and a front plate 13 connected to the bottom plate 11. In one embodiment, the bottom plate 11 is substantially perpendicular to the front plate 13. An opening 131 and two notches 133 are defined in the front plate 13. The two notches 133 are arranged in or on opposite sides of the opening 131.

The mounting tray 20 includes a front panel 21, a side panel 23 and a top panel 25. The top panel 25 is connected to the front panel 21 and the side panel 23. In one embodiment, the top panel 25 is substantially perpendicular to the front panel 21 and the side panel 23. A retaining panel 215 is connected to the front panel 21. The retaining panel 215 and the front panel 21 cooperatively define three expansion slots 214. A retaining portion 2151 extends upward from the retaining panel 215. A mounting panel 2171 is connected to the retaining panel 215, and a positioning piece 218 is connected to the mounting panel 217 and the retaining panel 215. The positioning piece 218 is substantially parallel to the top panel 25, and defines a positioning hole 2181. A first positioning post 271 is located on the outside of the mounting panel 217, corresponding to the notch 133. Two through holes 2173 are defined in the mounting panel 217, and a clipping tongue 2175 extends from an edge of each through hole 2713 towards the inside of the mounting panel 217. A positioning panel 231, with a second positioning post 2311, extends from the side panel 23. Three receiving holes (not shown), adjacent to the positioning panel 231, are defined in the side panel 23, for receiving the insertion portions 43. A securing tab 251 extends from the top panel 25 and is adjacent to the retaining portion 2151.

Figure 3:
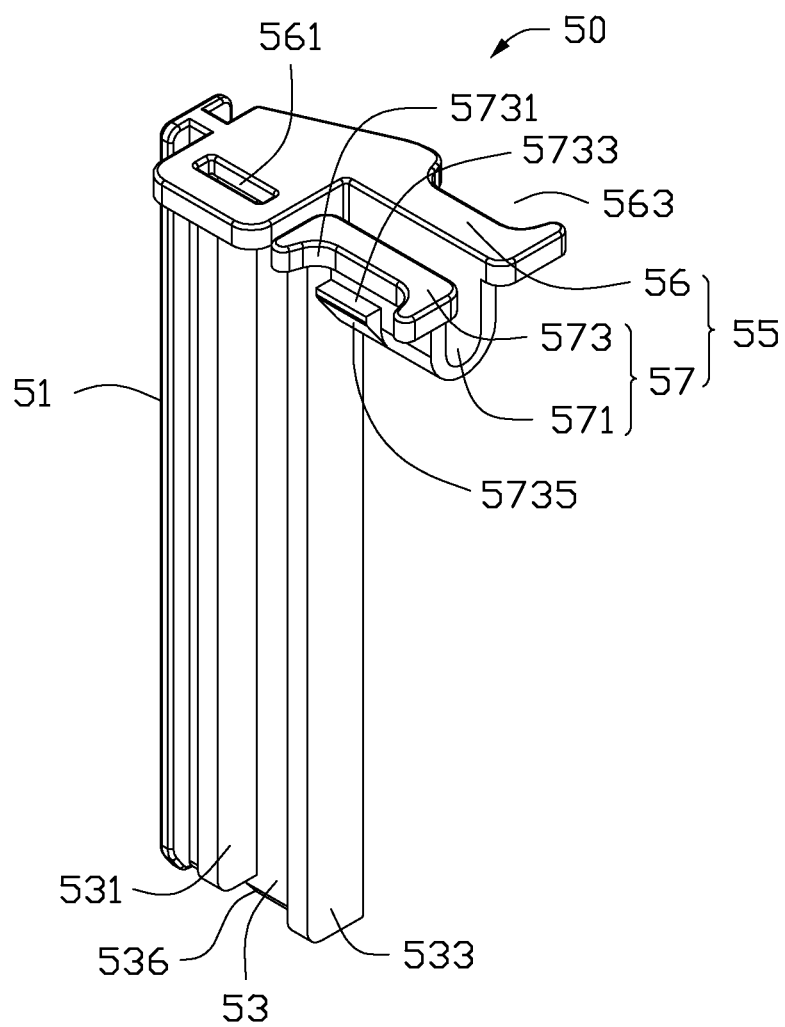
FIG. 3 is a view of a securing member of the mounting apparatus in accordance with an embodiment.

Referring to FIG. 3, the securing member 50 includes a base 51, a connecting plate 53 and a securing plate 55 mounted on the connecting plate 53. Two ribs 531, 533 are located on the connecting plate 53 and are substantially parallel to the base 51. A positioning tab 536 extends from a bottom of the connecting plate 53, corresponding to the positioning hole 2181. In one embodiment, the securing plate 55 is substantially perpendicular to the base 51.

The securing plate 55 includes a main body 56 and a resilient arm 57 (substantially parallel to the base 51) extending from the main body 56. A retaining hole 561 and a first cutout 563 are defined in the main body 56. The retaining hole 561 corresponds to the retaining portion 2151. In one embodiment, the first cutout 563 is crescent-shaped. The resilient arm 57 includes a coupling portion 571 and a securing portion 573 connected to the coupling portion 571. In one embodiment, the main body 56 and the securing portion 573 are located on the same plane, and the coupling portion 571 is U-shaped and the closed end of the "U" of the portion 571 extends to below that plane. A second cutout 5731 is defined in the securing portion 573. In one embodiment, the second cutout 5731 is also crescent-shaped, and the first and second cutouts 563, 5731 are back-to-back and function together for the convenience of the user when operating the securing member. A clasping portion 5733, having a slanting surface 5735, is located on the outside of the coupling portion 571. In one embodiment, a surface of the securing portion 573 is higher than that of the clasping portion 5733.

Figure 4:
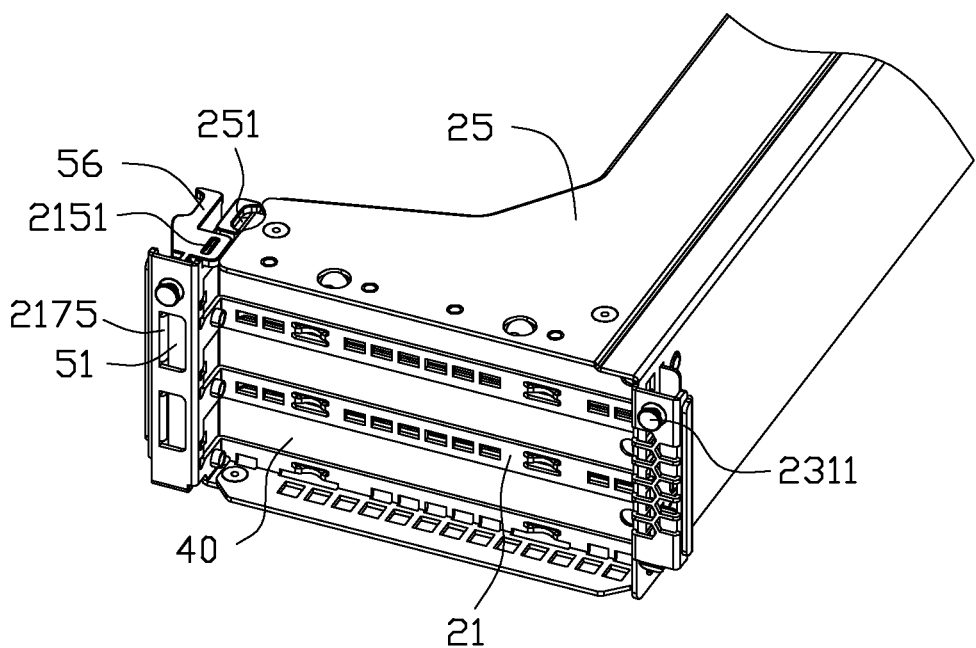
FIG. 4 is an assembled view of FIG. 1.
Figure 5:
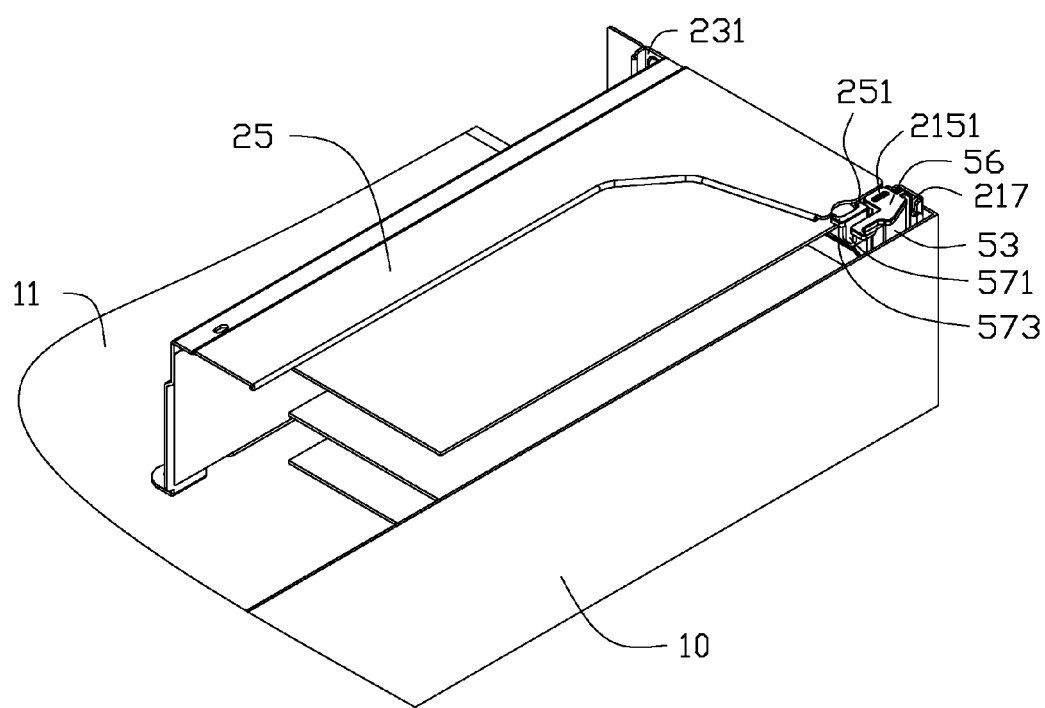
FIG. 5 is an assembled view of FIG. 2.
Figure 6:
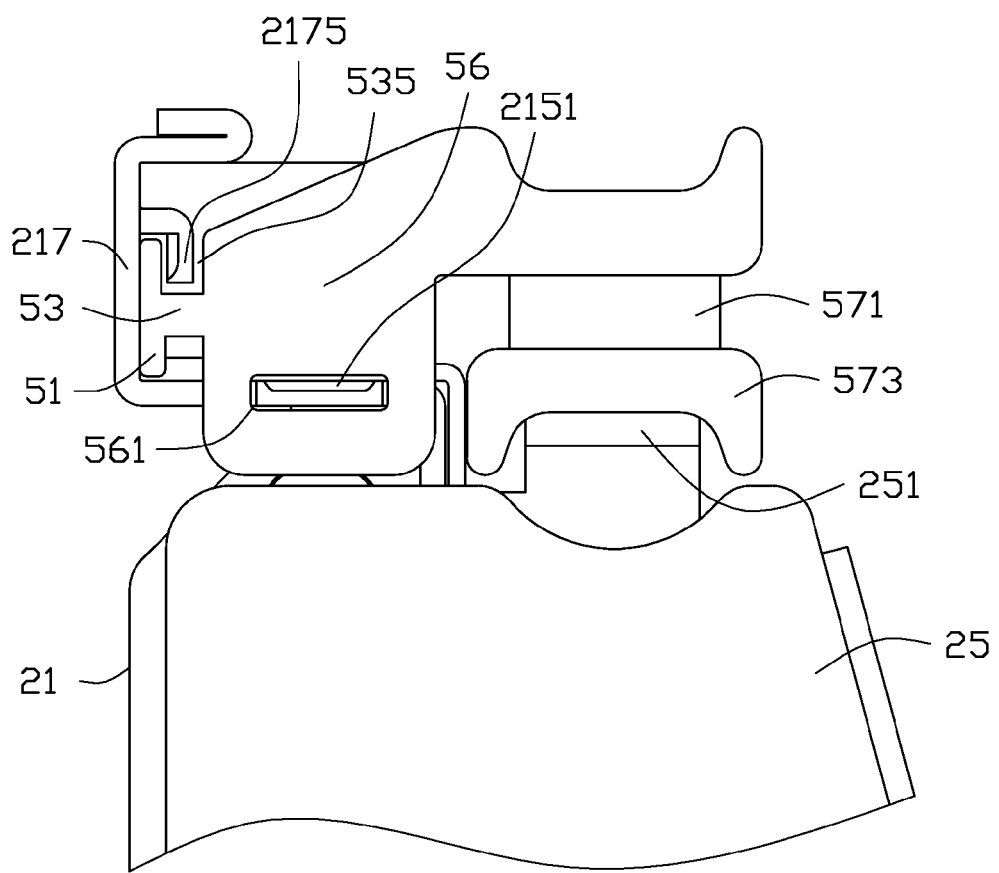
FIG. 6 is a top view of FIG. 5.

Referring to FIGS. 4 to 6, in assembly, the mounting tray 20 is accommodated in the opening 131. The first and second positioning posts 2171, 2311 are inserted into the two notches 135, and thereby the mounting tray 20 is secured to the front plate 13.

The three expansion cards 30 are received in the mounting tray 20, and the mounting members 40 are positioned in the expansion slots 214. The insertion portions 43 are inserted into the three receiving holes of the side panel 23. The flanges 41 abut the retaining panel 215.

The base 51 abuts the mounting panel 217 and is located between the retaining portion 2151 and the clipping tongue 2175, so as to engage the clipping tongue 2175 with the base 51. The securing member 50 is pressed in a direction substantially perpendicular to a surface of the bottom plate 11, until the slanting surface 5735 abuts the securing tab 251. The securing member 50 is pressed further in the same direction to deform the resilient arm 57, and the slanting surface 5735 passes over the securing tab 251. Thus, the securing tab 251 can abut on a top surface of the clasping portion 5733. The retaining portion 2151 is received in the retaining hole 561, and the positioning tab 536 is received in the positioning hole 2181. Therefore, the expansion cards 30 are all fixedly and firmly secured to the mounting tray 20.

In disassembly, the securing member 50 is operated by using the first and second cutout 563, 5731, to deform the resilient arm 57. When the clasping portion 5733 is disengaged from the securing tab 251, the securing member 50 moves upwards. The retaining portion 2151 has clearance through the retaining hole 561, and the positioning tab 536 has clearance through the positioning hole 2181. The base 51 is detached from the clipping tongue 2175, and thus the securing member 50 can be removed from the mounting tray 20. The expansion cards 30 may be moved, to disengage the insertion portions 43 from the receiving holes of the side panel 23, so that the expansion cards 30 may be detached from the mounting tray 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
    a chassis;
    a mounting member, adapted to secure an expansion card, comprising a flange;
    a mounting tray, received in the chassis, comprising a top panel, a front panel and a retaining panel connected to the front panel; a securing tab extending from the top panel; and
    a securing member comprising a base engaged with the front panel, a securing plate substantially perpendicular to the base; a resilient arm extending from the securing plate along a direction substantially parallel to a surface of the base, and a clasping portion located on the resilient arm; the resilient arm comprising a coupling portion and a securing portion connected to the coupling portion, the clasping portion located on the outside of the coupling portion, and a surface of the securing portion being higher than that of the clasping portion;
    wherein the flange is located between the retaining panel and the securing member, the clasping portion is engaged with the securing tab, and the resilient arm is deformable in the direction to disengage the clasping portion from the securing tab.

2. The mounting apparatus of claim 1, wherein the clasping portion comprises a slanting surface, and the slanting surface abuts the securing tab to deform the resilient arm.

3. The mounting apparatus of claim 1, wherein the coupling portion is U-shaped.

4. The mounting apparatus of claim 3, wherein the main body defines a first cutout, the securing portion defines a second cutout, and the first cutout and the second cutout are back to each other.

5. The mounting apparatus of claim 1, wherein the securing plate further comprises a main body, the securing portion and the main body are located on the same plane.

6. The mounting apparatus of claim 1, wherein a retaining portion is located on the retaining panel, and a retaining hole is defined in the securing plate and receives the retaining portion.

7. The mounting apparatus of claim 1, wherein the securing member further comprises a connecting plate substantially perpendicular to the base and the securing plate, and a rib is located on the connecting plate and substantially parallel to the base.

8. The mounting apparatus of claim 7, wherein a positioning tab extends from a bottom of the connecting plate, a positioning piece, defining a positioning hole, is connected to the retaining panel, and the positioning tab is received in the positioning hole.

9. The mounting apparatus of claim 1, wherein a mounting panel is connected to the retaining panel, and a clipping tongue extends from the mounting panel and clipped to the base.

10. A mounting apparatus comprising:
    a chassis;
    a mounting member, adapted to secure an expansion card, comprising a flange;
    a mounting tray, received in the chassis, comprising a top panel, a front panel and a retaining panel connected to the front panel; a securing tab extending from the top panel, a mounting panel connected to the retaining panel and comprising a clipping tongue towards to the retaining panel; and
    a securing member comprising a base and a securing plate substantially perpendicular to the base; a resilient arm extending from the securing plate along a first direction substantially parallel to a surface of the base;
    wherein the flange is located between the retaining panel and the securing member, the clipping tongue is clipped to the base, for preventing the securing member moving along the first direction substantially, and the resilient arm is engaged with the securing tab, for preventing the securing member moving in a second direction substantially perpendicular to the first direction.

11. The mounting apparatus of claim 10, wherein a clasping portion is located on the resilient arm, the clasping portion is engaged with the securing tab, and the resilient arm is deformable in the first direction to disengage the clasping portion from the securing tab.

12. The mounting apparatus of claim 11, wherein the clasping portion comprises a slanting surface, and the slanting surface abuts the securing tab to deform the resilient arm.

13. The mounting apparatus of claim 11, wherein the resilient arm comprises a coupling portion and a securing portion connected to the coupling portion, the clasping portion is located on the outside of the coupling portion, and a surface of the securing portion is higher than that of the clasping portion.

14. The mounting apparatus of claim 13, wherein the coupling portion is U-shaped.

15. The mounting apparatus of claim 13, wherein the securing plate further comprises a main body, the securing portion and the main body are located on the same plane.

16. The mounting apparatus of claim 15, wherein the main body defines a first cutout, the securing portion defines a second cutout, and the first cutout and the second cutout are back to each other.

17. The mounting apparatus of claim 10, wherein a retaining portion is located on the retaining panel, and a retaining hole is defined in the securing plate and receives the retaining portion.

18. The mounting apparatus of claim 10, wherein the securing member further comprises a connecting plate substantially perpendicular to the base and the securing plate, and a rib is located on the connecting plate and substantially parallel to the base.

19. The mounting apparatus of claim 18, wherein a positioning tab extends from a bottom of the connecting plate, a positioning piece, defining a positioning hole, is connected to the retaining panel, and the positioning tab is received in the positioning hole.

20. A mounting apparatus comprising:
a chassis;
a mounting member, adapted to secure an expansion card, comprising a flange;
a mounting tray, received in the chassis, comprising a top panel, a front panel and a retaining panel connected to the front panel; a securing tab extending from the top panel; and
a securing member comprising a base engaged with the front panel, a securing plate substantially perpendicular to the base, and a connecting plate substantially perpendicular to the base and the securing plate; a rib located on the connecting plate and substantially parallel to the base; a resilient arm extending from the securing plate along a direction substantially parallel to a surface of the base, and a clasping portion located on the resilient arm;
wherein the flange is located between the retaining panel and the securing member, the clasping portion is engaged with the securing tab, and the resilient arm is deformable in the direction to disengage the clasping portion from the securing tab.

\* \* \* \* \*